United States Patent [19]

Stone

[11] Patent Number: 5,037,180
[45] Date of Patent: Aug. 6, 1991

[54] OPTICAL FILTER ON OPTICAL FIBER END FACE

[75] Inventor: Julian Stone, Rumson, N.J.

[73] Assignee: AT&T Bell Laboratories, Murray Hill, N.J.

[21] Appl. No.: 555,115

[22] Filed: Jul. 19, 1990

[51] Int. Cl.[5] .......................... G02B 6/10; G02B 5/20
[52] U.S. Cl. ..................................... 385/123; 385/31; 359/890
[58] Field of Search .............. 350/96.10, 96.12, 96.11, 350/96.15, 96.16, 96.17, 96.20, 96.29, 96.30, 311, 316; 250/227.11; 370/1, 3

[56] References Cited

U.S. PATENT DOCUMENTS

| | | | |
|---|---|---|---|
| 4,358,851 | 11/1982 | Scifres et al. | 350/96.15 X |
| 4,759,596 | 7/1988 | Po et al. | 350/96.15 |
| 4,768,849 | 9/1988 | Hicks, Jr. | 350/96.15 |
| 4,867,520 | 9/1989 | Weidel | 350/96.16 |
| 4,892,388 | 1/1990 | Taylor | 350/96.15 X |
| 4,952,798 | 8/1990 | Graham et al. | 250/227.11 |
| 4,958,897 | 9/1990 | Yanagawa et al. | 350/96.15 |

Primary Examiner—Brian Healy
Attorney, Agent, or Firm—Eli Weiss

[57] ABSTRACT

In this invention there is disclosed an optical filter disposed on an optical fiber. More specifically, a filter comprised of a multilayer thin-film stack of low and high index of refraction material is deposited onto the end of an optical fiber. The filter can be, for example, a long-pass filter, a Fabry-Perot Etalon, a Double-Cavity Filter, and the like. Filters deposited on perpendicular facets of single-mode fibers reflect most of the power that is not transmitted. This reflection if fed back to a laser or an amplifier can cause a problem, particularly if an isolator does not adequately block the reflections. A bevel on the fiber end face can eliminate this problem by preventing the reflected power from being directed back into the optical fiber.

6 Claims, 3 Drawing Sheets

OPTICAL FILTER ON OPTICAL FIBER END FACE

TECHNICAL FIELD

This invention relates generally to passive optical filters and more particularly to a thin film filter which is an integral part of an optical fiber.

BACKGROUND OF THE INVENTION

Optical filters provide various important applications in optical fiber systems. Typically, they are used, for example, as bandpass filters, as noise blocking filters and as pump blocking filters. When used as bandpass filters, they provide for channel selection in wavelength-division multiplexing. When used as noise and pump blocking filters they are used with optical amplifiers. Presently, bulk filters when used for fiber-to-fiber coupling require expanded beam optics. Normally, these filters are expensive to produce and require lens alignment elements which are relatively large, unstable and complicated. Clearly, a need exists for an inexpensive filter which is not only compatible with optical fibers but does not require the relatively large cumbersome structure now required.

SUMMARY OF THE INVENTION

In this invention there is disclosed an optical filter disposed on an optical fiber. More specifically, a filter comprised of a multilayer thin-film stack of low and high index of refraction material is deposited onto the end of an optical fiber. The fiber can be, for example, a long-pass filter, a Fabry-Perot Etalon, a Double-Cavity Filter, and the like. Filters deposited on perpendicular facets of single-mode fibers reflect most of the power that is not transmitted. This reflection if fed back to a laser or an amplifier can cause a problem, particularly if an isolator does not adequately block the reflections. A bevel on the fiber end face can eliminate this problem by preventing the reflected power from being directed back into the optical fiber.

DETAILED DESCRIPTION

The theory for designing a wide variety of optical filters is well established as evidenced by the publication, Thin-Film Optical Filters, by H. A. Macleod, second edition, McGraw Hill, New York, 1989. As here disclosed, optical filters comprised of multilayer thin-film stacks, when deposited on the ends of optical fibers by thin film deposition, result in an inexpensive filter which is both directly compatible with optical fibers and avoids the need for relatively large cumbersome structure presently required with expanded-beam optics. The term thin film deposition can include electron beam evaporation, sputtering and the like.

Two embodiments of structure in accordance with the principle of the invention are short-pass filters and long-pass filters.

A simple design for a bandpass filter deposited on a substrate (sub) is of the form $$\text{sub}(M)\left(N\frac{\lambda}{2n}\right)(\overline{M})\text{air}$$

where mirrors M and $\overline{M}$ with a spacer of N half-optical wavelengths thickness between them provides a basic Fabry-Perot Etalon, N being the order number of the etalon, $\lambda$ the center wavelength and n the index of refraction of the spacer.

The mirror can be of the form of a thin-film stack

HLH...

or

LHL...

where H and L are quarter-wavelength optical thickness layers of high (H) and low (L) index optical materials respectively. For $\overline{M}$, the layers are deposited in reverse order from those of M. An increase of N or of the number of layers in the mirror results in a narrower filter bandpass.

A bandpass filter having steeper sides and a relatively flat top is obtained from $$\text{sub}\left[(M)\left(N\frac{\lambda}{2n}\right)(\overline{M})\frac{\lambda}{4n}\right]^p (M)\left(N\frac{\lambda}{2n}\right)(\overline{M})\text{air}.$$

where p=1 provides a two-cavity etalon with a nearly flat top and $1/(\Delta\lambda)^4$ skirts, and where $\Delta\lambda$ is the separation from the center wavelength.

Long pass filters and short pass filters (edge filters) can be made from the following arrangement $$\left(\frac{H}{2} L \frac{H}{2}\right)^m$$

gives a long-pass filter with little ripple, and similarly $$\left(\frac{L}{2} H \frac{L}{2}\right)^m$$

provides a short pass filter with little ripple.

Increasing m increases the cut-on or cut-off steepness of long-pass filters and short-pass filters, respectively.

Figure 1:
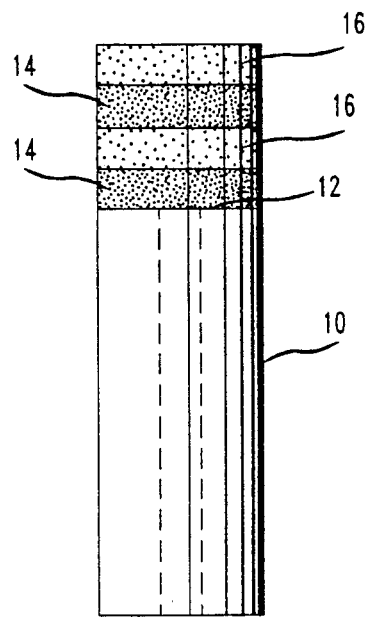
FIG. 1 is a side view of an optical fiber in combination with an optical filter in accordance with the principles of the invention.

Filters were fabricated onto the ends of fibers. For example, referring to FIG. 1, standard AT&T depressed-cladding fiber 10 was mounted in a rotary-connector ferrule (not shown) and the end 12 was carefully polished normal to the fiber axes. The fiber end and ferrule end was then coated with alternating layers of Si (index of refraction of approximately 3.2) 14 and SiO$_2$ (index of refraction of approximately 1.46) 16 by electron-beam deposition. This combination of materials has a high index of refraction contrast which yields high reflectances with fewer layers than other oxide pairs. Additionally, Si has low loss in the 1.3–1.5 $\mu$m wavelength region. The number of layers required to obtain a given reflectance depends approximately on the square of the ratio of the indexes of refraction of the low and high index layers. The depositions of the layers were controlled by monitoring the geometrical thickness using a quartz thickness monitor and optical thickness on bulk witness test glasses.

Figure 2:
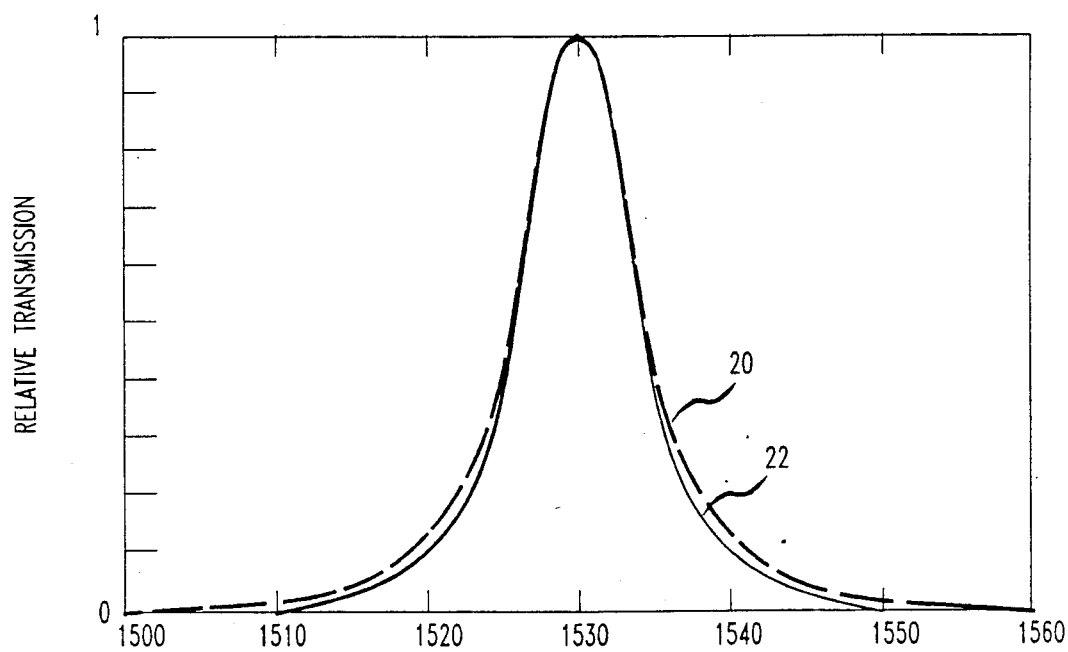
FIG. 2 is a plot of a Fabry-Perot Etalon with a bandpass at 1.5 $\mu$m.

Referring to FIG. 2, there is illustrated a curve of a Fabry-Perot Etalon—(HLHLH) (LL) (HLHLH)—22 with a bandpass at 1.5 μm. The theoretical curve 20 is also illustrated. The horizontal axis represents wavelength in m and the vertical axis represents the relative intensity of light which is transmitted. The 3-dB bandwidth is 8.5 nm.

Figure 3:
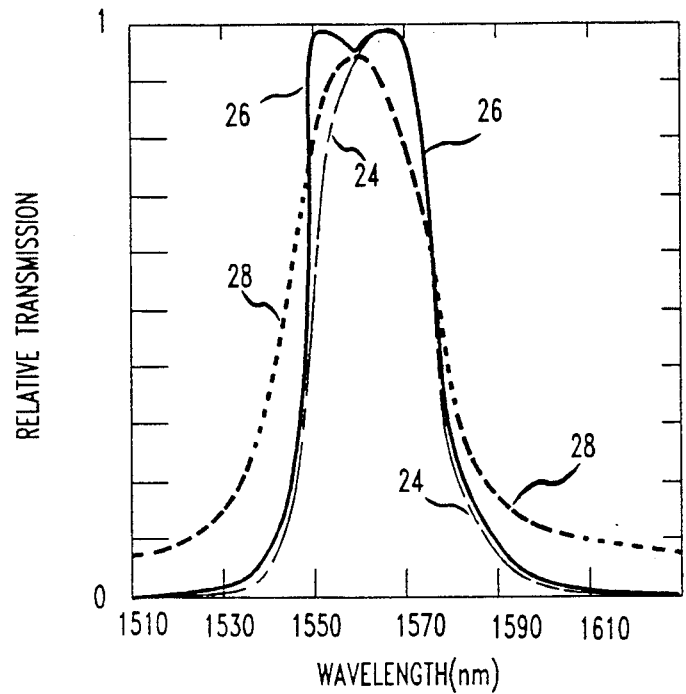
FIG. 3 is a plot of a double cavity first-order filter.

Referring to FIG. 3, there is illustrated the actual curve 24 of a double cavity first-order filter where the horizontal axis represents wavelength and the vertical axis represents the relative intensity of the light passed. The curve 26 represents the theoretical result. Curve 28 is for the corresponding single-cavity etalon. The steep skirts of the double cavity design are evident while the top, although expected from the theoretical results, is not flat. The undulating top is attributed to slight errors in the layer thickness or indexes of refraction. An error of a few percent in the index of refraction of the second layer is sufficient to change the shape of the top of the curve without affecting the skirts in a computer simulation. Except for a small wavelength shift, the same spectrum was obtained for the bulk witness. This difference is attributed to a slight temperature difference between the witness sample and the fiber sample during the deposition process. The bandwidth is 24nm and the actual peak transmission is close to 90% while the theoretical peak is near 95%.

Figure 4:
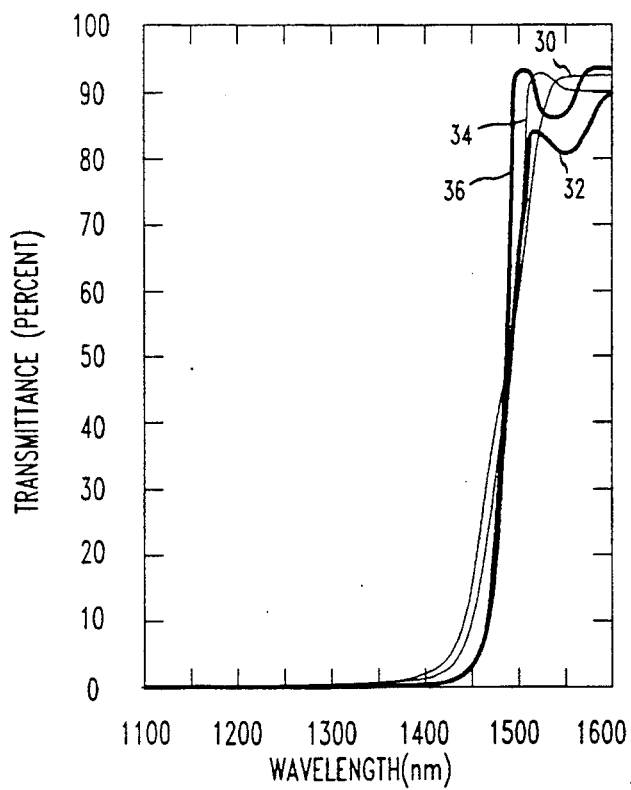
FIG. 4 is a plot of actual and theoretical curves of two long-pass filters.

A long pass filter $$\left(\frac{H}{2} L \frac{H}{2}\right)^m,$$

m=7,9 can be used, for example, as a pump-blocking filter for an Er doped fiber amplifier which is pumped at 1.48 μm. Referring to FIG. 4, there is illustrated curves 30, 32 for two long-pass filters where 34 is the theoretical curve and curve 30 is the actual curve of one filter where m=7; and, curve 36 is the theoretical curve and curve 32 is the actual curve of the other filter where m=9. The horizontal axis represents wavelength and the vertical axis represents the percent of light transmitted. In fabricating these filters, the design wavelength (the wavelength for a quarter-wave thickness) is substantially 1 μm as the filter is actually a modified mirror being used at the transmission edge. The long-pass transmission exceeds 80%. For the m=9 filter, the knee is reduced slightly which is probably due to small errors of thickness.

Figure 5:
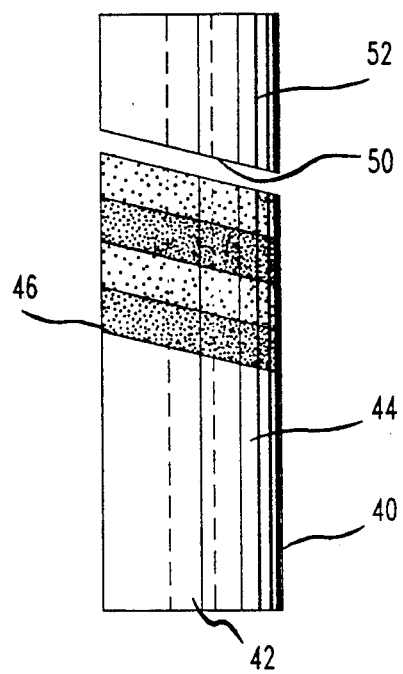
FIGS. 5 and 6 are views of structure in accordance with the principles of the invention.

Filters of the type disclosed above deposited on perpendicular facets of single-mode optical fibers reflect most of the power which is not transmitted. This reflected light, if fed back to a laser or an amplifier can cause a problem, particularly if the associated isolators do not adequately block the reflections. One solution to eliminating this problem is to bevel the fiber end face so that reflected power is not coupled back into the waveguide. Referring to FIG. 5, there is illustrated an optical fiber 40 comprised of a core 42 and a surrounding cladding 44. The end face 46 of the optical fiber is beveled by grinding or the like and polished to have a specific angle. The desired filters is then deposited onto the beveled end face of the optical fiber. It is to be noted that the filter is applied to the core and the cladding end face of the fiber, not just to the core. The end face 50 of the optical fiber 52 which is to be coupled to the filter on the end face of fiber 40 can be ground to have a bevel similar to that on end face 46 of fiber 40.

Figure 6:
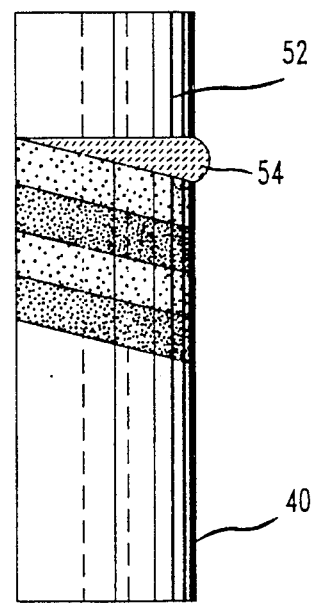

If the end face 50 of fiber 52 is not ground to an angle which is equal to that of fiber 40, but is ground to be perpendicular, then material 54 having a desired index of refraction can be positioned between the two ends to fill the existing air space as illustrated in FIG. 6. The filter spectrum is altered slightly due to the presence of material 54 in contact with it. A 4° bevel reduces reflected power by >20dB and an 8° bevel by better than 40dB. The only effect observed on the filter characteristic shape due to the bevel angle is a nearly negligible shift to shorter wavelength for 4°; and a somewhat larger shift for 8° (this shift is quadratic in bevel angle). The filter spectra are otherwise essentially unaltered for these small bevel angles and no walk-off loss was detected. For a high-reflecting mirror the back reflection was measured to be 43dB for an 8° bevel below that for a similar mirror deposited on a perpendicular end face.

In the description above, structure having two discrete indexes of refraction were deposited onto the end of a fiber. It is to be understood that a single layer or layers having more than two discrete indexes of refraction can be deposited onto the end of a fiber in accordance with the principles of this invention.

I claim:
1. An optical fiber comprising
   a core within a cladding,
   an optical filter comprising a thin-film stack of low and high index of refraction material applied to an end face of said optical fiber by thin film deposition, and the end face of the optical fiber and said optical filter is at an angle which is within a range which varies from less than 90 degrees to 75 degrees relative to the core of said optical fiber.
2. The optical fiber of claim 1 coupled to
   a second optical fiber comprising a core and a cladding and at least one end face, said end face of said second optical fiber has an angle which is substantially equal to that of said first optical fiber and means to optically align said first and second optical fibers to each other end-to-end.
3. The arrangement of claim 2 wherein the angle of the end face of said second optical fiber is not equal to the angle of the face of said second optical fiber.
4. The arrangement of claim 3 wherein the end face of said second optical fiber is substantially perpendicular to the core of said second fiber.
5. The arrangement of claim 3 comprising material having an index of refraction other than air positioned between said ends of said optical fibers.
6. The arrangement of claim 5 wherein said material has an index of refraction which is substantially equal to the index of refraction of the core of one of said optical fibers.

* * * * *